US011176263B2

(12) United States Patent
Ovcharik et al.

(10) Patent No.: US 11,176,263 B2
(45) Date of Patent: Nov. 16, 2021

(54) SYSTEM AND METHOD OF DETECTING AN UNAUTHORIZED ALTERATION IN REGARDS TO A CERTIFICATE STORE

(71) Applicant: AO Kaspersky Lab, Moscow (RU)

(72) Inventors: Vladislav I. Ovcharik, Moscow (RU); Oleg G. Bykov, Moscow (RU); Natalya S. Sidorova, Moscow (RU)

(73) Assignee: AO Kaspersky Lab, Moscow (RU)

( * ) Notice: Subject to any disclaimer, the term of this patent is extended or adjusted under 35 U.S.C. 154(b) by 352 days.

(21) Appl. No.: 16/359,223

(22) Filed: Mar. 20, 2019

(65) Prior Publication Data
US 2020/0004979 A1 Jan. 2, 2020

(30) Foreign Application Priority Data

Jun. 29, 2018 (RU) ............................ RU2018123690

(51) Int. Cl.
| | |
|---|---|
| *G06F 21/64* | (2013.01) |
| *G06F 21/62* | (2013.01) |
| *G06F 21/60* | (2013.01) |
| *G06F 21/33* | (2013.01) |
| *G06F 16/23* | (2019.01) |
| *G06F 21/10* | (2013.01) |

(Continued)

(52) U.S. Cl.
CPC ...... *G06F 21/6218* (2013.01); *G06F 16/2358* (2019.01); *G06F 21/105* (2013.01); *G06F 21/33* (2013.01); *G06F 21/554* (2013.01); *G06F 21/604* (2013.01); *G06F 21/64* (2013.01); *H04L 9/3268* (2013.01); *G06F 2221/0724* (2013.01)

(58) Field of Classification Search
CPC ....... H04L 9/3268; G06F 21/64; G06F 21/554
See application file for complete search history.

(56) References Cited

U.S. PATENT DOCUMENTS

| 7,949,771 B1 | 5/2011 | Chen et al. |
| 2006/0005244 A1* | 1/2006 | Garbow .............. H04L 63/1425 726/24 |

(Continued)

OTHER PUBLICATIONS

Adil Alsaid et al: "Installing Fake Root Keys in a PC", Jun. 30, 2005 (Jun. 30, 2005), Public Key Infrastructure Lecture Notes in Computer Science;;LNCS, Springer, Berlin, DE, pp. 227-239.

*Primary Examiner* — David J Pearson
(74) *Attorney, Agent, or Firm* — Arent Fox LLP; Michael Fainberg

(57) ABSTRACT

Disclosed herein are systems and methods for detecting unauthorized alteration with regard to a certificate store. In one aspect, an exemplary method comprises, tracking changes in a file system or a system registry of an operating system of a device with regard to the certificate store, detecting an alteration or an attempted alteration with regard to the certificate and sending information about the alternation or the attempted alteration to an analysis module, obtaining information about at least one certificate with which a change in the file system or the system registry with regard to the certificate store is connected, and determining a class of the change, where the class of the change is determined from a portion of the respective system registry or the file system in which the change occurred and from an action associated with the change, and comparing the obtained information to similar information on known certificates.

20 Claims, 5 Drawing Sheets

(51) Int. Cl.
  *G06F 21/55* (2013.01)
  *H04L 9/32* (2006.01)

(56) References Cited

U.S. PATENT DOCUMENTS

| | | | |
|---|---|---|---|
| 2014/0095866 A1* | 4/2014 | Grebennikov | H04L 9/3263 |
| | | | 713/156 |
| 2016/0323104 A1* | 11/2016 | Mayers | H04L 63/0407 |
| 2018/0219689 A1* | 8/2018 | Waldron | H04L 9/3265 |
| 2018/0337957 A1 | 11/2018 | Chen | |

\* cited by examiner

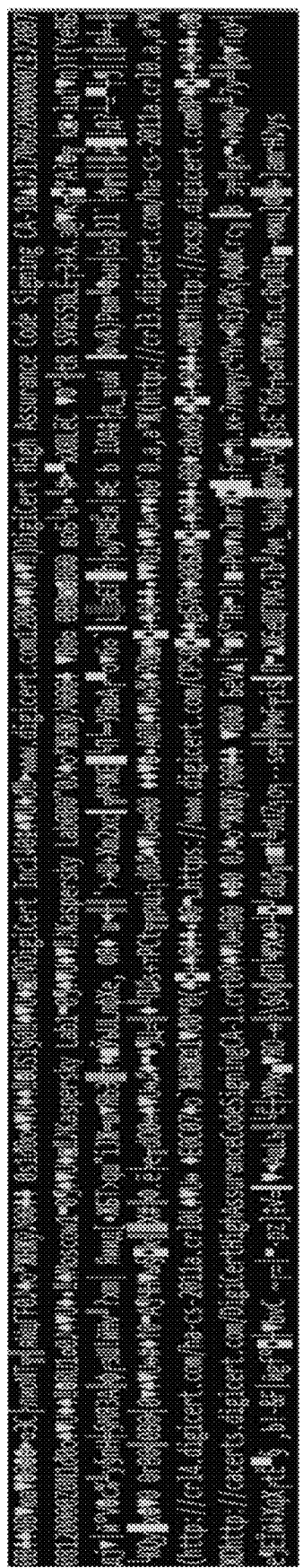
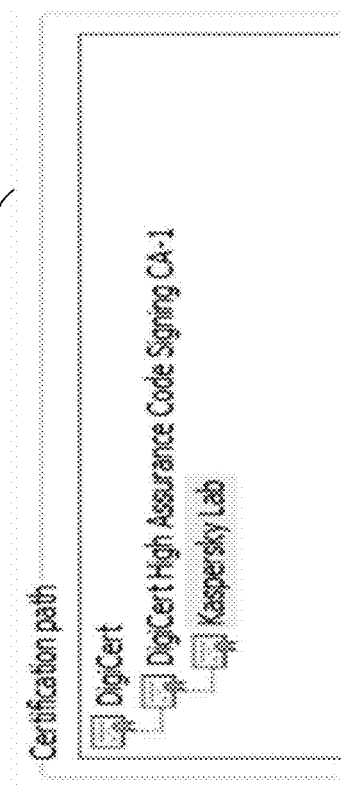
Fig. 1a

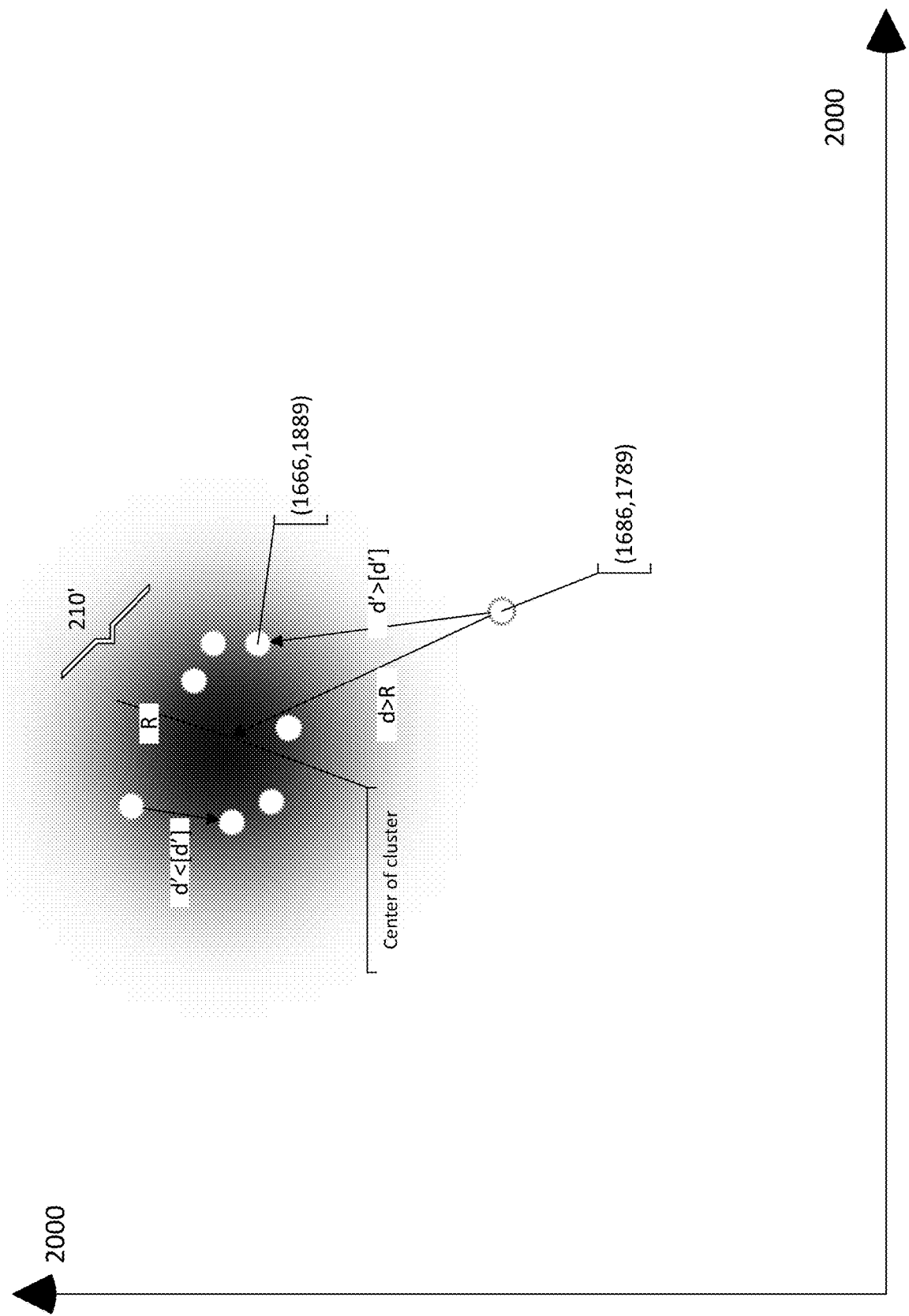

SYSTEM AND METHOD OF DETECTING AN UNAUTHORIZED ALTERATION IN REGARDS TO A CERTIFICATE STORE

CROSS REFERENCE TO RELATED APPLICATIONS

The present application claims priority to Russian Patent Application No. 2018123690, filed on Jun. 29, 2018, the entire content of which is incorporated herein by reference.

FIELD OF TECHNOLOGY

The present disclosure relates to the field of detecting instances of unauthorized access to a computer system or network, or unauthorized control thereof; more specifically, to systems and methods of detecting an unauthorized alteration in regard to a certificate store.

BACKGROUND

At present, there is a growing need for providing data security. The use of digital signatures has become a dependable approach for controlling the integrity of data and the authentication of the entity signing a file. A digital signature is an electronic encrypted seal confirming the authenticity of digital data, such as email communications, macros or electronic documents. The signature confirms that the data have been presented by the author who signed them and have not been altered. In order to create a digital signature, a signature certificate verifying the entity is needed. The certificate is sent with a public key together with the macro or document verified by the digital signature. The certificates are issued by a certification center, and they may be revoked. Generally, a certificate is good for one year, after which the signing party must extend it or obtain a new certificate to verify their identity.

Digital signatures have been a serious obstacle to hackers. Customary attacks, including phishing, have become more complicated to carry out. Therefore, methods of attack on the electronic digital signature and local certificate stores have come to be developed. One such exemplary attack is a CertLock attack (from Certification Lock). This attack is able to block a verified certificate in a local certificate store. As a result of the blocking of the verified certificate, the files signed by the issuer of the certificate cannot be launched in accordance with policies of the operating system. Another example is a Man In The Middle (MITM) attack on Transport Layer Security (TLS). In order to carry out the attack, the hacker (attacker) needs to install a specially prepared client Secure Sockets Layer (SSL) certificate in the local storage of the victim, the key of which is known to the attacker. This makes it possible to afterwards "convince" the client software that it is interacting with a trusted server, whereas in fact communication is taking place with a network resource of the hacker. Therefore, the detection of the attack using such approaches takes too great a time. Moreover, the approach is not viable for counter attack.

Hence, there is a need to improve how instances of unauthorized access to a computer system or network or unauthorized control of such computer system or network are detected.

SUMMARY

Aspects of the disclosure relate to the field of computer security, more specifically to systems and methods detecting unauthorized alteration with regard to a certificate store.

In one exemplary aspect, a method for detecting unauthorized alteration with regard to a certificate store is implemented in a computer comprising a hardware processor, the method comprising: tracking changes in a file system or a system registry of an operating system of a device with regard to the certificate store, detecting an alteration or an attempted alteration with regard to the certificate and sending information about the alternation or the attempted alteration to an analysis module, when the alteration or the attempted alteration occurs, obtaining information about at least one certificate with which a change in the file system or the system registry with regard to the certificate store is connected, and determining a class of the change, where the class of the change is determined from a portion of the respective system registry or the file system in which the change occurred and from an action associated with the change, and comparing the obtained information about the at least one certificate to similar information on known certificates.

According to one aspect of the disclosure, a system is provided for detecting unauthorized alteration with regard to a certificate store, the system comprising a hardware processor configured to: track changes in a file system or a system registry of an operating system of a device with regard to the certificate store, detect an alteration or an attempted alteration with regard to the certificate and send information about the alternation or the attempted alteration to an analysis module, when the alteration or the attempted alteration occurs, obtain information about at least one certificate with which a change in the file system or the system registry with regard to the certificate store is connected, and determine a class of the change, where the class of the change is determined from a portion of the respective system registry or the file system in which the change occurred and from an action associated with the change, and compare the obtained information about the at least one certificate to similar information on known certificates.

In one exemplary aspect, a non-transitory computer-readable medium is provided storing a set of instructions thereon for detecting unauthorized alteration with regard to a certificate store, wherein the set of instructions comprises instructions for: tracking changes in a file system or a system registry of an operating system of a device with regard to the certificate store, detecting an alteration or an attempted alteration with regard to the certificate and sending information about the alternation or the attempted alteration to an analysis module, when the alteration or the attempted alteration occurs, obtaining information about at least one certificate with which a change in the file system or the system registry with regard to the certificate store is connected, and determining a class of the change, where the class of the change is determined from a portion of the respective system registry or the file system in which the change occurred and from an action associated with the change, and comparing the obtained information about the at least one certificate to similar information on known certificates.

In one aspect, the method further comprises sending a result of the comparison to the analysis module, where the result of the comparison is a status of the certificate.

In one aspect, the status of the certificate comprises a status selected from: the certificate is trusted; the certificate is untrusted; the certificate is revoked; the certificate is similar to one which is trusted; the certificate is similar to one which is untrusted; the certificate is similar to one which is revoked; and the certificate is unknown.

In one aspect, the action associated with the change is at least one of: an installing of the at least one certificate; a blocking of the at least one certificate; and a deletion of the at least one certificate.

In one aspect, information about a particular certificate is added to a database of known certificates after installing the particular certificate on a device connected with a remote store and a construction of a chain of trust for the particular certificate.

In one aspect, the comparison of the certificates is based on a comparison of: hashes of the certificates or N-dimensional vectors formed from the obtained information.

In one aspect, the N-dimensional vectors are formed from the obtained information based on a set of attributes of the certificate, the attributes including one or more of: a date and time of a start and an end of validity of the certificate; an owner of the certificate of the signature key; a public key; a name and details of the certification center; a designation of the cryptographic algorithm; information on a restriction of a use of the signature; an indication of a country of issue of the certificate; frequency characteristics of symbols of the certificate; and line offsets in the certificate and their length.

The detecting of the unauthorized alterations with regard to a certificate store in accordance with the teachings of the present disclosure improves computer security. The improvement is achieved by: tracking changes in a file system or a system registry of an operating system of a device with regard to the certificate store, detecting an alteration or an attempted alteration with regard to the certificate and sending information about the alternation or the attempted alteration to an analysis module, when the alteration or the attempted alteration occurs, obtaining information about at least one certificate with which a change in the file system or the system registry with regard to the certificate store is connected, and determining a class of the change, where the class of the change is determined from a portion of the respective system registry or the file system in which the change occurred and from an action associated with the change, and comparing the obtained information about the at least one certificate to similar information on known certificates.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1a is an example of a certificate and a chain of trust.

FIG. 2 is an example of a two-dimensional space usable for transforming information about content of a certificate in accordance with the present disclosure.

DETAILED DESCRIPTION

Exemplary aspects are described herein in the context of a system, method, and a computer program for detecting unauthorized alteration with regard to a certificate store. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
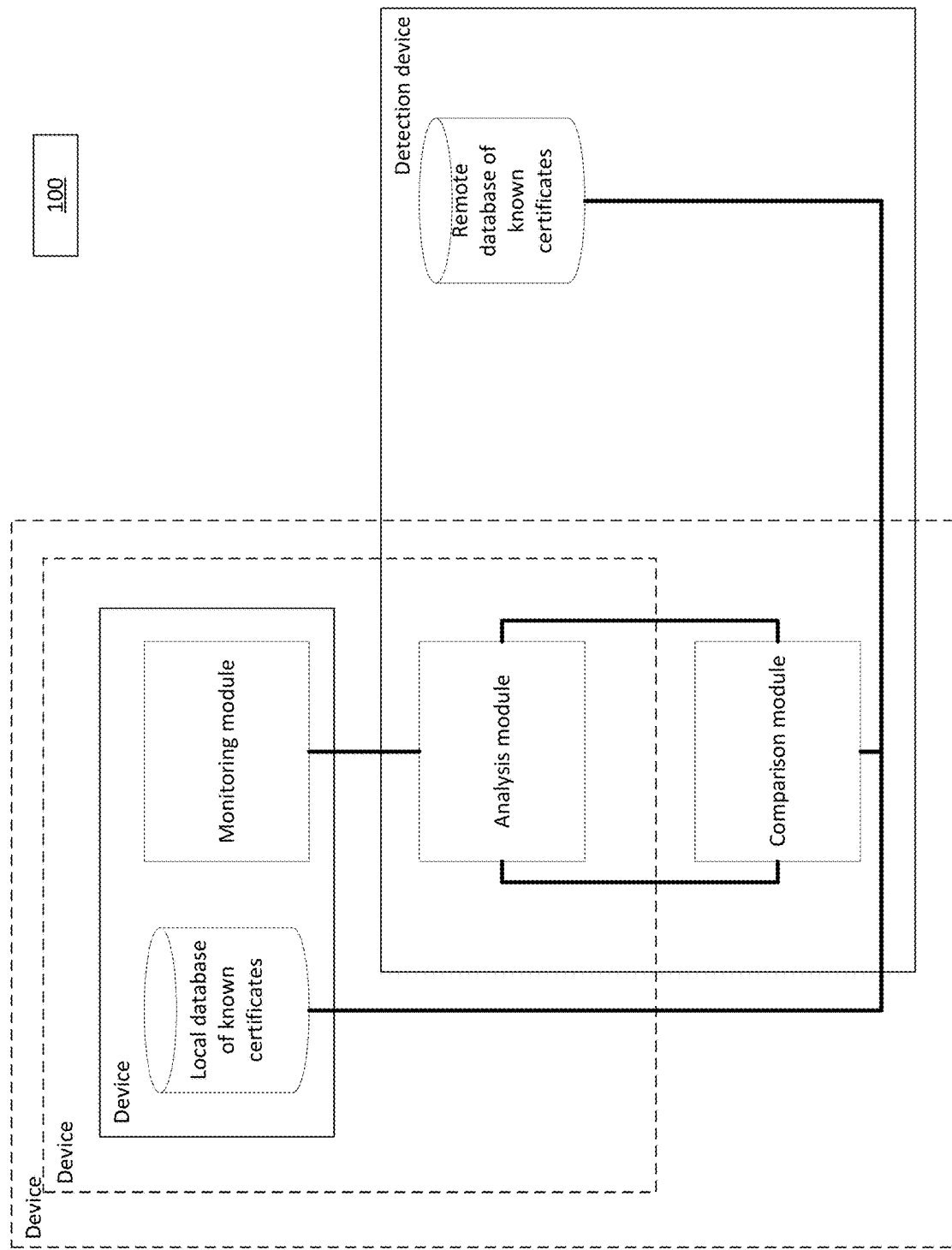
FIG. 1 is a block diagram illustrating an exemplary system for detecting unauthorized alteration with regard to the certificate store of a device in accordance with aspects of the present disclosure.

FIG. 1 is a block diagram illustrating an exemplary system 100 for detecting unauthorized alteration with regard to the certificate store of a device in accordance with aspects of the present disclosure.

The system 100 includes at least a monitoring module, an analysis module, a comparison module and a database of known certificates. The monitoring module is designed to track changes in the file system and/or registry with regard to the certificate store on the computer device (personal computer, mobile telephone, tablet, etc., hereafter simply device). In one aspect, the monitoring module tracks the records in the registry and file system connected with the certificate store. The monitoring module sends, to the analysis module, information as to any alteration with regard to the certificate store on the device. The analysis module is designed to determine the nature of the changes (i.e., the classification). In one aspect, the analysis module breaks down the alteration with regard to the certificate store into the following classes:

an installing of a certificate;
a deletion of a certificate; or
a blocking of a certificate.

In one aspect, the analysis module also obtains information about the certificate with which changes with regard to the certificate store are connected, and sends this information to the comparison module. The comparison module is designed to compare the certificate with which are connected the changes in the certificate store to known certificates from the database of known certificates of the system 100, which contains trusted certificates, untrusted certificates, and revoked certificates. The purpose of the comparison of the certificates is to determine the status of the certificate (trusted, untrusted, revoked, unknown) with which the changes are connected. The comparison may result in determining either an identity with known certificates (i.e., exact match) or a similarity to known certificates. Identical certificates are those which match up entirely (100 percent). Similar certificates are those for which the match is less than 100 percent. The identical versus similar assessment is made based on the overall sum of all attributes; however, the match may be a 100 percent match for certain attributes. Consequently, the results of the comparison may look like the following:

the certificate is:
 trusted,
 untrusted, or
 revoked;
the certificate is similar to one which is:
 trusted,
 untrusted, or
 revoked;
the certificate is unknown, wherein a certificate is considered to be unknown if it is absent from the database of known certificates (is not identical to known certificates and/or not similar to known certificates).

The comparison may be made by: determining identity from hashes (thumbprints) of the certificates; determining similarity by N-dimensional vectors of the certificates. The results of the comparison are sent by the comparison module to the analysis module.

The analysis module compares the status of the certificate (the result of comparing the certificate by the comparison module of the system 100) to the class of changes carried out with regard to the certificate store, and detects an unauthorized alteration with regard to the certificate store on the device in the event that at least:

an untrusted certificate has been installed;
an unknown certificate has been installed;
a trusted certificate has been blocked; or
a trusted certificate has been deleted.

The database of known certificates of the system 100 is designed to store the known certificates and/or attributes of known certificates, clusters, and rules. The certificates may be kept both individually (not interrelated) and in a list, where the list is a set of certificates organized by any attribute (such as the owner of the certificate). In one aspect, the lists are clusters. Clusters do not store the certificates themselves, but rather their mappings—N-dimensional vectors. Thus, the database of known certificates may store: the forbidden certificates themselves; the forbidden certificates on lists; mappings of forbidden certificates, for example, in the form of rules connecting common attributes or in the form of N-dimensional vectors; mappings of forbidden certificates in clusters. In the case where the database stores a mapping of forbidden certificates in N-dimensional vectors and/or clusters, it is understood that the database stores a model of the N-dimensional space of forbidden certificates.

A certificate can be added to the database of known certificates, including by the analysis module of the system 100 after said certificate is installed on one of the devices associated with the remote database of known certificates. The analysis module of the system 100 adds the certificate to the database if a chain of trust is constructed for the certificate. In one aspect, it is necessary for that certificate to also be similar to a known trusted certificate. For example, FIG. 1*a* illustrates an example of a certificate and a chain of trust 110, installed in the system 100, and detected by the monitoring module of the system 100. Yet, the certificate 110 is discovered by the results of the comparison performed by the comparison module of the system 100. In other words, the certificate is discovered even if unknown although it is similar to a trusted certificate from the database of known certificates (i.e., the certificate is absent from the database of the known certificates). The analysis module of the system 100, after checking the validity of the certificate (for example, having constructed a chain of trust 120), adds this certificate to the database of known certificates with the status of trusted. In aspects of the present disclosure, the status assigned to a certificate (trusted, untrusted, revoked) is determined by the status of the certificate to which the given certificate is similar.

The N-dimensional vector of a certificate is an ordered set of n real numbers, where the numbers are the coordinates of the vector. The quantity of coordinates of a vector is known as the dimensionality of the vector. The coordinates determine the position of the corresponding certificate or group of certificates of the same type of resources (such as the TOR network, which is a network for anonymous communication) in an N-dimensional space.

FIG. 2 is an example of a two-dimensional space usable for transforming information about content of a certificate in accordance with the present disclosure. In other words, FIG. 2 shows an example of the N-dimensional space, when N is equal to two. The vector is produced by transforming information about the content of the certificate or group of certificates. The vector maps information about the content of the certificate or group of certificates. In one aspect, each coordinate maps one of the characteristics of the certificate. For example, one coordinate may characterize the certification center, another coordinate may characterize the owner of the certificate. The numbers may also map the lexicographical order of the string parameters of the certificates or the Levenshtein distance between the string parameters of different elements of the certificate. For example, in FIG. 2, examples of vectors, in particular two-dimensional vectors with coordinates (1666, 1889) and (1686,1789), are shown.

A cluster is a group of N-dimensional vectors of certificates. A certificate intercepted by the monitoring module of the system 100 is assigned to a certain cluster if the distance from the N-dimensional vector of the intercepted certificate to the center of that cluster is less than the radius of the cluster in the direction of the N-dimensional vector. Returning to FIG. 2, the figure illustrates an example of a cluster. In one aspect, an element is assigned to a certain cluster if the value of the distance (d' in FIG. 2) from the N-dimensional vector of the certificate to the nearest N-dimensional vector of an element of this cluster is less than the maximum permissible (the threshold value of the distance [d']), or if the value of the distance (d in FIG. 2) from the N-dimensional vector of the certificate to the center of said cluster is less than the radius of this cluster. For example, the distance from the vector (1666, 1889) to the center of the cluster is less than the radius of the cluster, and so the certificate or group of certificates the content of which is mapped by the vector belong to that cluster; conversely, if the distance from the vector (1686, 1789) to the center of the cluster is greater than the radius of the cluster, and the distance to the nearest N-dimensional vector is greater than the threshold value, then the certificate or group of certificates the content of which is mapped by the vector do not belong to that cluster. In one aspect, the distance for evaluating the proximity is selected from the following:

a linear distance;
an Euclidean distance;
a square of the Euclidean distance;
a generalized power distance of Minkowski;
a Chebyshev distance; or
a Manhattan distance.

The measure of proximity (degree of similarity, coefficient of similarity) is a non-dimensional parameter for determining the similarity of certificates. The types of distances and measures of proximity are distance metrics. For determining the measure of proximity the a measure is selected from the following measures:

Ohaai;
Jacquard;
Sokal-Sneath;
Kulczinsky; or
symmetrical Dyce.

The center of a cluster (centroid) is the mean geometrical locus of the N-dimensional vectors in N-dimensional space. For clusters consisting of a single vector, that vector is the center of the cluster.

The radius of a cluster (R in FIG. 2) is the maximum distance of the N-dimensional vectors making up the cluster from the center of the cluster.

Figure 3:
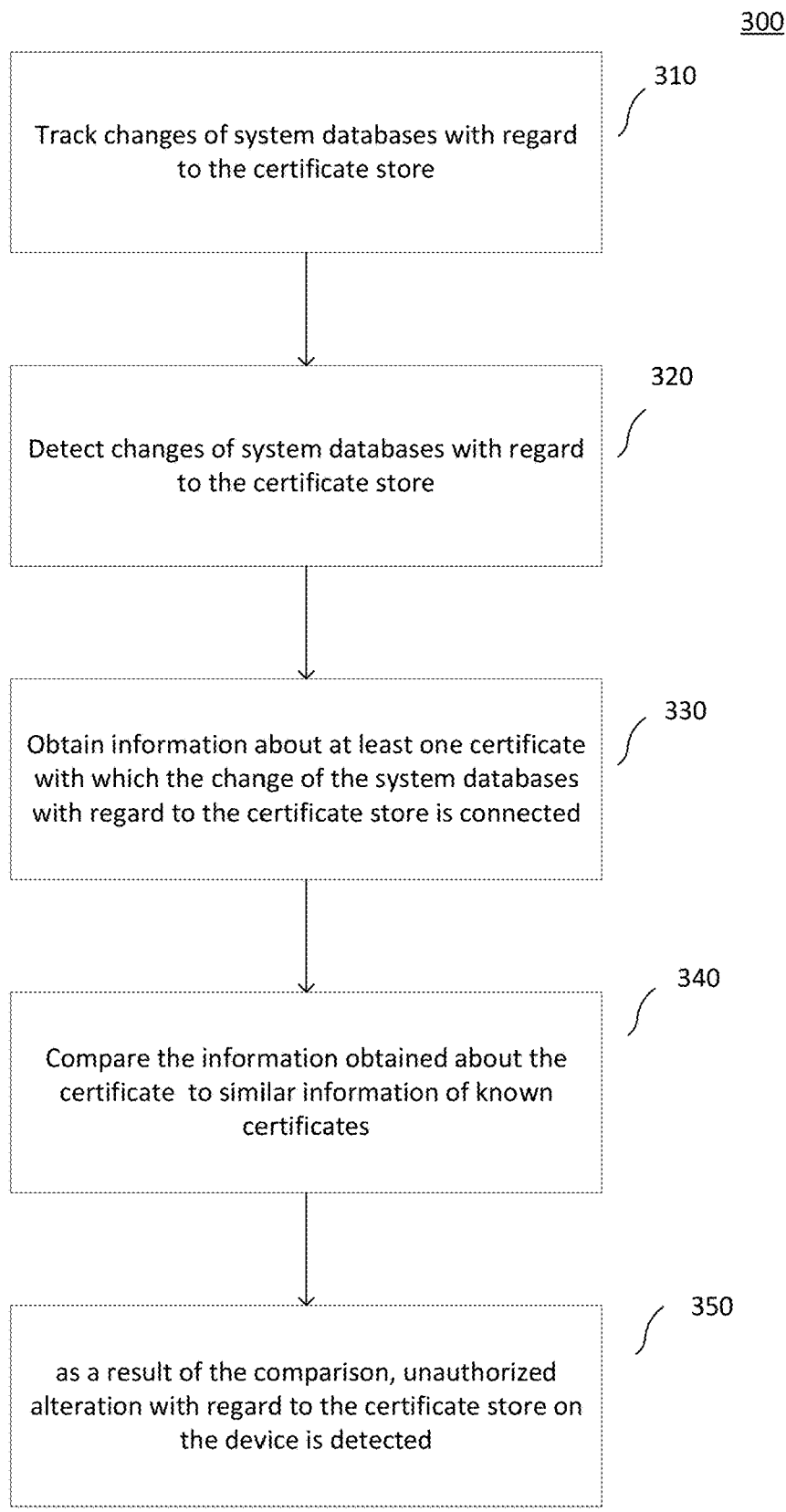
FIG. 3 is a flow diagram illustrating an exemplary method for detecting unauthorized alteration with regard to a certificate store.

FIG. 3 is a flow diagram illustrating an exemplary method 300 for detecting unauthorized alteration with regard to a certificate store. The system 100 illustrated in FIG. 1 is used to implement the method 300 for detecting an unauthorized alteration with regard to the certificate store of a device.

In step 310, tracking, by a monitoring system, changes in a file system or a system registry of an operating system of a device with regard to the certificate store.

In step 320, detecting, by the monitoring module, an alteration or an attempted alteration with regard to the certificate and sending information about the alternation or the attempted alteration to an analysis module, when the alteration or the attempted alteration occurs.

In step 330, the method obtains, by the analysis module, information about at least one certificate with which a change in the file system or the system registry with regard to the certificate store is connected, and determines a class of the change, where the class of the change is determined from a portion of the respective system registry or the file system in which the change occurred and from an action associated with the change. The action associated with the change comprises the essence of the change, e.g., writing of data, deleting of data, overwriting of data, and the like. The information about the certificate obtained by the analysis module of the system 100 is sent to the comparison module.

In step 340, the method compares, by the comparison module, the obtained information about the at least one certificate to similar information on known certificates. In one aspect, in step 340, the comparison module establishes not only the identity of the certificate being analyzed to known ones, but also determines the similarity of this certificate to known certificates.

In one aspect, the comparison of the certificates is based on a comparison of the hashes of the certificates. In one aspect, the comparison of the certificates is based on N-dimensional vectors formed from the information obtained from the analysis module. In one aspect, the comparison module forms the N-dimensional vector from the information obtained from the analysis module based on a set of attributes of the certificate. In one aspect, the attributes of the certificate include one or more of:
  a date and time of a start and an end of validity of the certificate,
  an owner of the certificate of the signature key,
  a public key,
  a name and details of the certification center,
  a designation of the cryptographic algorithm,
  information on a restriction of a use of the signature,
  an indication of a country of issue of the certificate,
  frequency characteristics of symbols of the certificate, and
  line offsets in the certificate and their length, and others.

The obtained N-dimensional vector is compared with the N-dimensional vectors of known certificates. In one aspect, when constructing the vector in an N-dimensional space, different weights may be used for each attribute to calculate the coordinates. In one aspect, the weights are determined by the frequency of occurrence of the given attribute in the certificates (e.g., the lower the frequency, the greater the weight). In one aspect, the weights are computed with the aid of neural nets, for example, by using the method of backward error propagation together with the gradient descent method. When determining identity, the obtained N-dimensional vector is compared to the N-dimensional vectors of known certificates and the certificate is recognized as being known when the obtained N-dimensional vector matches up with the N-dimensional vector of a known certificate in the N-dimensional space. When determining a similarity, the obtained vector is compared (by determining the mutual distance, for example, between the obtained vector and the center of the cluster) with the clusters of known certificates.

In one aspect, based on the result of the comparison, the intercepted certificate is recognized as being similar to the known certificates when:
  the distance between the N-dimensional vector of the certificate and the center of at least one cluster in the database, in the N-dimensional space, is less than the radius of this cluster; or
  the measure of proximity between the N-dimensional vector of an element and the center of at least one cluster, in the N-dimensional space, is less than a threshold value.

The comparison module of the system 100 sends the results of the comparison to the analysis module, where the comparison result is the status of the certificate. Namely:
  the certificate is:
    trusted,
    untrusted, or
    revoked;
  the certificate is similar to one which is:
    trusted,
    untrusted, or
    revoked;
  the certificate is unknown.

In step 350, the analysis module compares the class of the change in the file system and/or the system registry that was determined in step 330 to the results of the comparison from step 340, and detects an unauthorized alteration with regard to the certificate store on the device, whereing the alteration can be recognized as unauthorized, when:
  an untrusted certificate has been installed;
  an unknown certificate has been installed;
  a trusted certificate has been blocked;
  a certificate similar to a trusted one has been blocked;
  a trusted certificate has been deleted;
  a certificate similar to a trusted one has been deleted;
  an untrusted certificate has been unblocked;
  a revoked certificate has been unblocked; or
  a certificate similar to an untrusted one has been unblocked on the device.

An example of the implementation of the method is presented below. A monitoring module is functioning on a device, which tracks changes relating to the certificate store in the registry and file system. In the process of checking, the monitoring module detects an accessing of the registry branch, e.g.,
  HKLM\SOFTWARE\Microsoft\SystemCertificates\Disallowed\Certificates\,
  and
a writing of certain data at the accessed registry branch, the data being:
  D1 DB DD 61 15 20 D2 C4 8F 51 05 A5 4F 02 08 1E 5E 52 E0 C7.

The data is sent to the analysis module, where the analysis module, in accordance with the purpose of this branch (the branch stores blocked certificates), determines that the detected change belongs to the class of changes of blocking of certificates, and that the written data correspond to the hash of a certificate. Then, the hash of the certificate is sent to the comparison module, which compares the obtained hash to the thumbprints of known certificates. As a result of the comparison, the comparison module discovers the same hash for a trusted certificate "KasperskyLab sEnterpriseCA".

The obtained information is then sent to the analysis module, which forms a state, assigning to the detected class of changes the status of the certificate "blocking" (class of changes)—trusted certificate (status of certificate). The obtained state is then compared to the rules, in which unauthorized changes include the blocking of a trusted certificate, and thus, an unauthorized alteration with regard to the certificate store on the device is detected.

It is necessary to establish the similarity for certificates which are not found in the database of known certificates in order to avoid errors when a trusted certificate is recognized as unknown or an untrusted certificate is recognized as unknown. Therefore, in the case when a chain of trust has been constructed for the certificate, but the certificate is not present among the known certificates, the similarity of the certificate is established and, as indicated above. If the certificate proves to be similar to a trusted and valid certificate (the chain of trust is built), the certificate is recognized as trusted and is added to the database of known certificates.

In one aspect, the monitoring module, the comparison module, and the analysis module of the present disclosure comprise actual devices, systems, components, or group of components, realized with the use of hardware such as integrated microcircuits (application-specific integrated circuits, ASICs) or field-programmable gate arrays (FPGAs) or, for example, in the form of a combination of software and hardware such as a microprocessor system and a set of program instructions, and also based on neuro-synaptic chips. The functionality of said modules may be realized exclusively by hardware, and also in the form of a combination, where some of the functionality is realized by software and some by hardware. In certain aspects of the present disclosure, the modules can be implemented on the processor of a general-purpose computer (such as the one depicted in FIG. 4). The databases may be realized by every standard methods known in the art and may be contained either on a single physical medium or on different ones, situated either locally or remotely.

As described above, the result and main advantage of the present disclosure is to ensure detection of an unauthorized alteration with regard to the certificate store on a device, during in real time. The detection is accomplished by carrying out the method of detecting unauthorized alteration with regard to the certificate store on the device in real time, in which, changes are monitored in the OS of the device in regard to the certificate store. In the course of the monitoring, a change with regard to the certificate store on the device is discovered. Information is then obtained about at least one certificate with which the change in regard to the certificate store is associated, and the information obtained about the certificate is compared to similar information about known certificates. As a result of the comparison, the unauthorized alteration with regard to the certificate store on the device is detected.

When carrying out the method described above, changes in the OS in regard to the certificate store are monitored during real time operations. The changes in the OS of the device with regard to the certificate store may be tracked through the system registry or the file system.

In one aspect, the changes in the OS with regard to the certificate store may be connected with at least one of: an installing of a certificate; a blocking of a certificate; and a deletion of a certificate. That is, the action associated with the change is at least one of: an installing of the at least one certificate; a blocking of the at least one certificate; and a deletion of the at least one certificate.

In one aspect, the information about the certificate is a hash of the certificate, where the hash of the certificate is obtained and compared to hashes of known trusted and untrusted certificates.

In another aspect, the information about the certificate is transformed into an N-dimensional vector, a distance between the N-dimensional vector obtained by the transformation of the information about the certificate and N-dimensional vectors of known trusted and untrusted certificates is computed, and a comparison is made based on the computed distance between the obtained N-dimensional vector and the N-dimensional vectors of known trusted and untrusted certificates.

In one aspect, the alteration is recognized as unauthorized when at least: an untrusted certificate has been installed; an unknown certificate has been installed, where a certificate is considered to be unknown if it is not present among the known certificates; a trusted certificate has been blocked; or a trusted certificate has been deleted on the device.

In one aspect, the information about the known certificates may be kept both in the local store and in a remote store. In one aspect, information about a particular certificate may be added to the database of known certificates after installing the particular certificate on one of the devices connected with the remote store and a construction of a chain of trust for the particular certificate.

Figure 4:
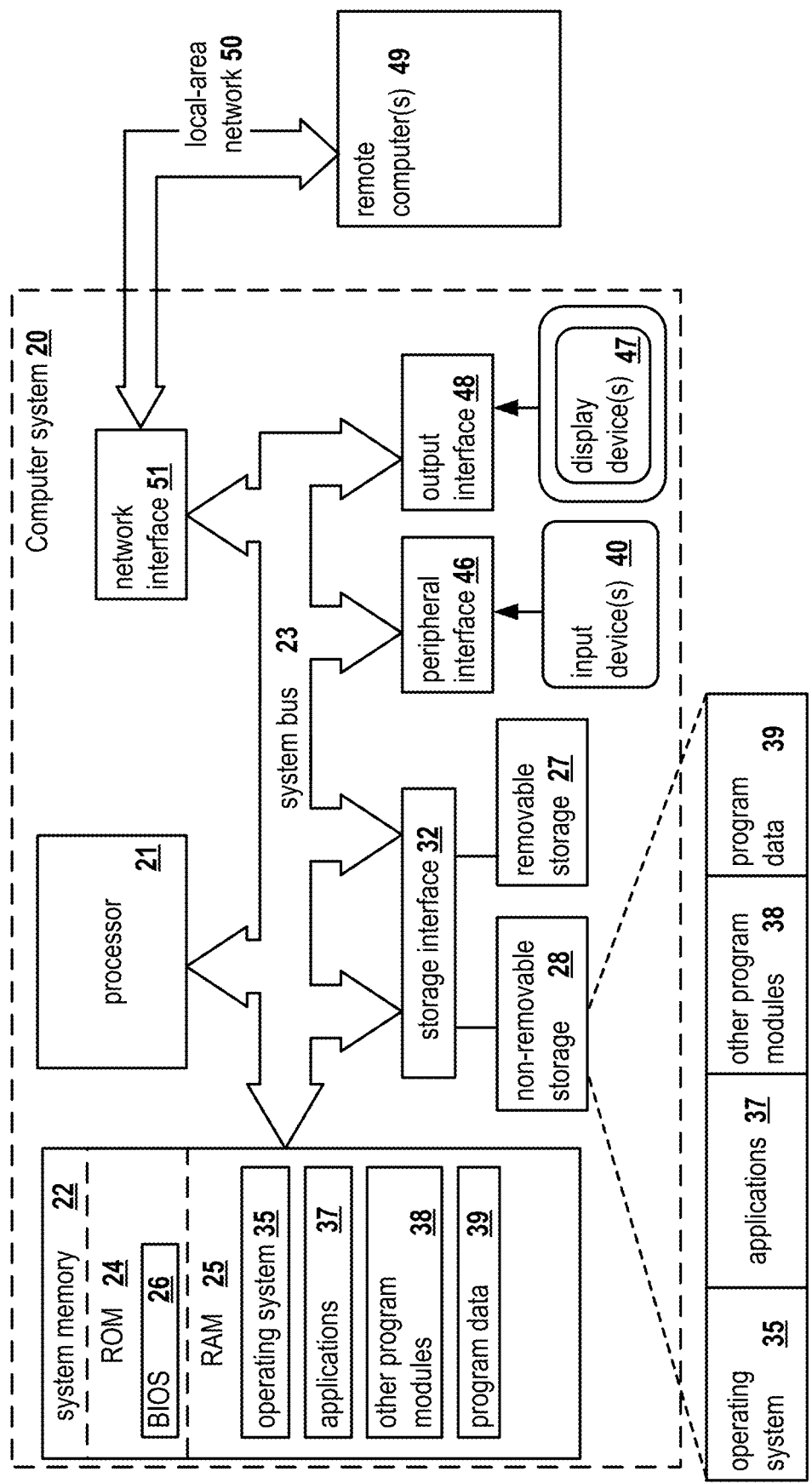
FIG. 4 presents an example of a general-purpose computer system on which aspects of the present disclosure can be implemented.

FIG. 4 is a block diagram illustrating a computer system 20 on which aspects of systems and methods for detecting unauthorized alteration with regard to a certificate store may be implemented in accordance with an exemplary aspect. It should be noted that the computer system 20 can correspond to a detection device, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting unauthorized alteration with regard to a certificate store, the method comprising:
   tracking changes in a file system or a system registry of an operating system of a device with regard to the certificate store;
   detecting an alteration or an attempted alteration with regard to the certificate and sending information about the alternation or the attempted alteration to an analysis module, when the alteration or the attempted alteration occurs;
   obtaining information about at least one certificate with which a change in the file system or the system registry with regard to the certificate store is connected, and determining a class of the change, where the class of the change is determined from a portion of the respective system registry or the file system in which the change occurred and from an action associated with the change;
   forming N-dimensional vectors from the obtained information; and
   comparing the obtained information about the at least one certificate to similar information on known certificates, wherein the comparison is performed by at least comparing the N-dimensional vectors formed from the obtained information.

2. The method of claim 1, further comprising:
   sending a result of the comparison to the analysis module, where the result of the comparison is a status of the certificate.

3. The method of claim 2, wherein the status of the certificate comprises a status selected from:
   the certificate is trusted;
   the certificate is untrusted;
   the certificate is revoked;
   the certificate is similar to one which is trusted;
   the certificate is similar to one which is untrusted;
   the certificate is similar to one which is revoked; and
   the certificate is unknown.

4. The method of claim 1, wherein the action associated with the change is at least one of: an installing of the at least one certificate; a blocking of the at least one certificate; and a deletion of the at least one certificate.

5. The method of claim 1, wherein information about a particular certificate is added to a database of known certificates after installing the particular certificate on a device connected with a remote store and a construction of a chain of trust for the particular certificate.

6. The method of claim 1, wherein the comparison of the certificates is further based on a comparison of: hashes of the certificates.

7. The method of claim 1, wherein the N-dimensional vectors are formed from the obtained information based on a set of attributes of the certificate, the attributes including one or more of:
   a date and time of a start and an end of validity of the certificate;
   an owner of the certificate of the signature key;
   a public key;
   a name and details of the certification center;
   a designation of the cryptographic algorithm;
   information on a restriction of a use of the signature;
   an indication of a country of issue of the certificate;
   frequency characteristics of symbols of the certificate; and
   line offsets in the certificate and their length.

8. A system for detecting unauthorized alteration with regard to a certificate store, comprising:
   at least one hardware processor configured to:
      track changes in a file system or a system registry of an operating system of a device with regard to the certificate store;
      detect an alteration or an attempted alteration with regard to the certificate and send information about the alternation or the attempted alteration to an analysis module, when the alteration or the attempted alteration occurs;
      obtain information about at least one certificate with which a change in the file system or the system registry with regard to the certificate store is connected, and determine a class of the change, where the class of the change is determined from a portion of the respective system registry or the file system in which the change occurred and from an action associated with the change;
      form N-dimensional vectors from the obtained information; and
      compare the obtained information about the at least one certificate to similar information on known certificates, wherein the comparison is performed by at least comparing the N-dimensional vectors formed from the obtained information.

9. The system of claim 8, the hardware processor further configured to:
   send a result of the comparison to the analysis module, where the result of the comparison is a status of the certificate.

10. The system of claim 9, wherein the status of the certificate comprises a status selected from:
   the certificate is trusted;
   the certificate is untrusted;
   the certificate is revoked;
   the certificate is similar to one which is trusted;
   the certificate is similar to one which is untrusted;
   the certificate is similar to one which is revoked; and
   the certificate is unknown.

11. The system of claim 8, wherein the action associated with the change is at least one of: an installing of the at least one certificate; a blocking of the at least one certificate; and a deletion of the at least one certificate.

12. The system of claim 8, wherein information about a particular certificate is added to a database of known certificates after installing the particular certificate on a device connected with a remote store and a construction of a chain of trust for the particular certificate.

13. The system of claim 8, wherein the comparison of the certificates is further based on a comparison of: hashes of the certificates.

14. The system of claim 8, wherein the N-dimensional vectors are formed from the obtained information based on a set of attributes of the certificate, the attributes including one or more of:
- a date and time of a start and an end of validity of the certificate;
- an owner of the certificate of the signature key;
- a public key;
- a name and details of the certification center;
- a designation of the cryptographic algorithm;
- information on a restriction of a use of the signature;
- an indication of a country of issue of the certificate;
- frequency characteristics of symbols of the certificate; and
- line offsets in the certificate and their length.

15. A non-transitory computer readable medium storing thereon computer executable instructions for detecting unauthorized alteration with regard to a certificate store, including instructions for:
- tracking changes in a file system or a system registry of an operating system of a device with regard to the certificate store;
- detecting an alteration or an attempted alteration with regard to the certificate and sending information about the alternation or the attempted alteration to an analysis module, when the alteration or the attempted alteration occurs;
- obtaining information about at least one certificate with which a change in the file system or the system registry with regard to the certificate store is connected, and determining a class of the change, where the class of the change is determined from a portion of the respective system registry or the file system in which the change occurred and from an action associated with the change;
- forming N-dimensional vectors from the obtained information; and
- comparing the obtained information about the at least one certificate to similar information on known certificates, wherein the comparison is performed by at least comparing the N-dimensional vectors formed from the obtained information.

16. The non-transitory computer readable medium of claim 15, the instructions further comprising:
- sending a result of the comparison to the analysis module, where the result of the comparison is a status of the certificate.

17. The non-transitory computer readable medium of claim 16, wherein the status of the certificate comprises a status selected from:
- the certificate is trusted;
- the certificate is untrusted;
- the certificate is revoked;
- the certificate is similar to one which is trusted;
- the certificate is similar to one which is untrusted;
- the certificate is similar to one which is revoked; and
- the certificate is unknown.

18. The non-transitory computer readable medium of claim 15, wherein the action associated with the change is at least one of: an installing of the at least one certificate; a blocking of the at least one certificate; and a deletion of the at least one certificate.

19. The non-transitory computer readable medium of claim 15, wherein information about a particular certificate is added to a database of known certificates after installing the particular certificate on a device connected with a remote store and a construction of a chain of trust for the particular certificate.

20. The non-transitory computer readable medium of claim 15, wherein the comparison of the certificates is further based on a comparison of: hashes of the certificates.

* * * * *